US012578874B2

(12) United States Patent
De La Torre et al.

(10) Patent No.: US 12,578,874 B2
(45) Date of Patent: Mar. 17, 2026

(54) CONFIGURING A QUORUM COMPONENT ON NETWORK STORAGE

(71) Applicant: HITACHI VANTARA LLC, Santa Clara, CA (US)

(72) Inventors: Jonathan De La Torre, Tracy, CA (US); Kevin Tang, Granite Bay, CA (US); Dan Swartz, Santa Clara, CA (US); Dang Luong, San Jose, CA (US); Paul Romero, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 18/723,505

(22) PCT Filed: Feb. 4, 2022

(86) PCT No.: PCT/US2022/015168
§ 371 (c)(1),
(2) Date: Jun. 24, 2024

(87) PCT Pub. No.: WO2023/149887
PCT Pub. Date: Aug. 10, 2023

(65) Prior Publication Data
US 2025/0044950 A1 Feb. 6, 2025

(51) Int. Cl.
*G06F 3/06* (2006.01)

(52) U.S. Cl.
CPC .......... *G06F 3/0619* (2013.01); *G06F 3/0665* (2013.01); *G06F 3/067* (2013.01)

(58) Field of Classification Search
CPC ....... G06F 3/0619; G06F 3/0665; G06F 3/067
See application file for complete search history.

(56) References Cited

U.S. PATENT DOCUMENTS 8,589,550 B1 * 11/2013 Faibish ................. G06F 3/0662
709/225
9,454,417 B1 9/2016 Van Der Goot
(Continued)

FOREIGN PATENT DOCUMENTS

EP 3 316 114 A1 5/2018

OTHER PUBLICATIONS

Dan Luong, "How To Configure Amazon Machine Image as Global-Active Device iSCSI Quorum Target" White Paper, by Hitachi Vantara, Nov. 2019.

(Continued)

*Primary Examiner* — Eric T Loonan
(74) *Attorney, Agent, or Firm* — MATTINGLY & MALUR, PC

(57) ABSTRACT

In some examples, a computing device of a first network storage receives a virtual machine image and executable instructions for creating a quorum component for a second network storage and a third network storage that replicate data. The computing device implements the virtual machine on the computing device based on the virtual machine image. Further, based on implementing the virtual machine, the computing device executes the executable instructions to create a logical volume on a storage device associated with the computing device, and to create, in the logical volume, at least one target volume for receiving quorum information from the second network storage and/or the third network storage. Connections are established between the virtual machine and the second network storage and the third network storage for the virtual machine to receive quorum information. The virtual machine stores the quorum information in the at least one target volume.

20 Claims, 8 Drawing Sheets

(56) References Cited

U.S. PATENT DOCUMENTS

| | | | | |
|---|---|---|---|---|
| 10,417,102 | B2 * | 9/2019 | Sanakkayala | G06F 11/1438 |
| 11,461,031 | B1 * | 10/2022 | Moran | G06F 13/4022 |
| 2006/0265497 | A1 | 11/2006 | Ohata et al. | |
| 2010/0057913 | A1 | 3/2010 | Dehaan | |
| 2011/0258622 | A1 | 10/2011 | Burckart et al. | |
| 2012/0291021 | A1 * | 11/2012 | Banerjee | G06F 9/45558 |
| | | | | 717/173 |
| 2014/0297782 | A1 | 10/2014 | Umbehocker | |
| 2016/0203069 | A1 * | 7/2016 | Gill | G06F 11/2094 |
| | | | | 709/224 |
| 2017/0010908 | A1 | 1/2017 | Matzek et al. | |
| 2017/0123945 | A1 * | 5/2017 | Panasko | G06F 11/2094 |
| 2018/0260125 | A1 | 9/2018 | Botes et al. | |
| 2021/0357246 | A1 | 11/2021 | Kumar et al. | |
| 2022/0164265 | A1 * | 5/2022 | Krishnan | G06F 11/2076 |
| 2022/0188006 | A1 * | 6/2022 | Suzuki | G06F 3/0659 |
| 2023/0089663 | A1 * | 3/2023 | Shankar | G06F 3/0659 |
| | | | | 711/154 |

OTHER PUBLICATIONS

Configure Azure VM as GAD Quorum, White Paper, by Hitachi Vantara, 2021. Apr. 2021.
Sean Grady, "Global Active Device: Remote, Virtualized Storage From HDS", Rocket, Jan. 30, 2022.
Global-Active Device: Continuous Operation and Availability for Key Applications, Datasheet, by Hitachi Vantara, DS-352-G BTD Sep. 2019.
HPE 3PAR Quorum Witness Installation and Update Guide, by Hewlett Packard Enterprise, Mar. 2022.
International Search Report of PCT/US2022/015168 dated May 23, 2022.
Anonymous: "Workstation User's Manual", Sep. 20, 2007 (Sep. 20, 2007), pp. 1-470, XP093325833, Retrieved from the Internet: URL:https://ist.mit.edu/sites/default/files/migration/products/vmware/ws6-manual.pdf?utm_source=chatgpt.com.
European Search Report received in corresponding European Application No. 22925168.1 dated Nov. 6, 2025.

* cited by examiner

200

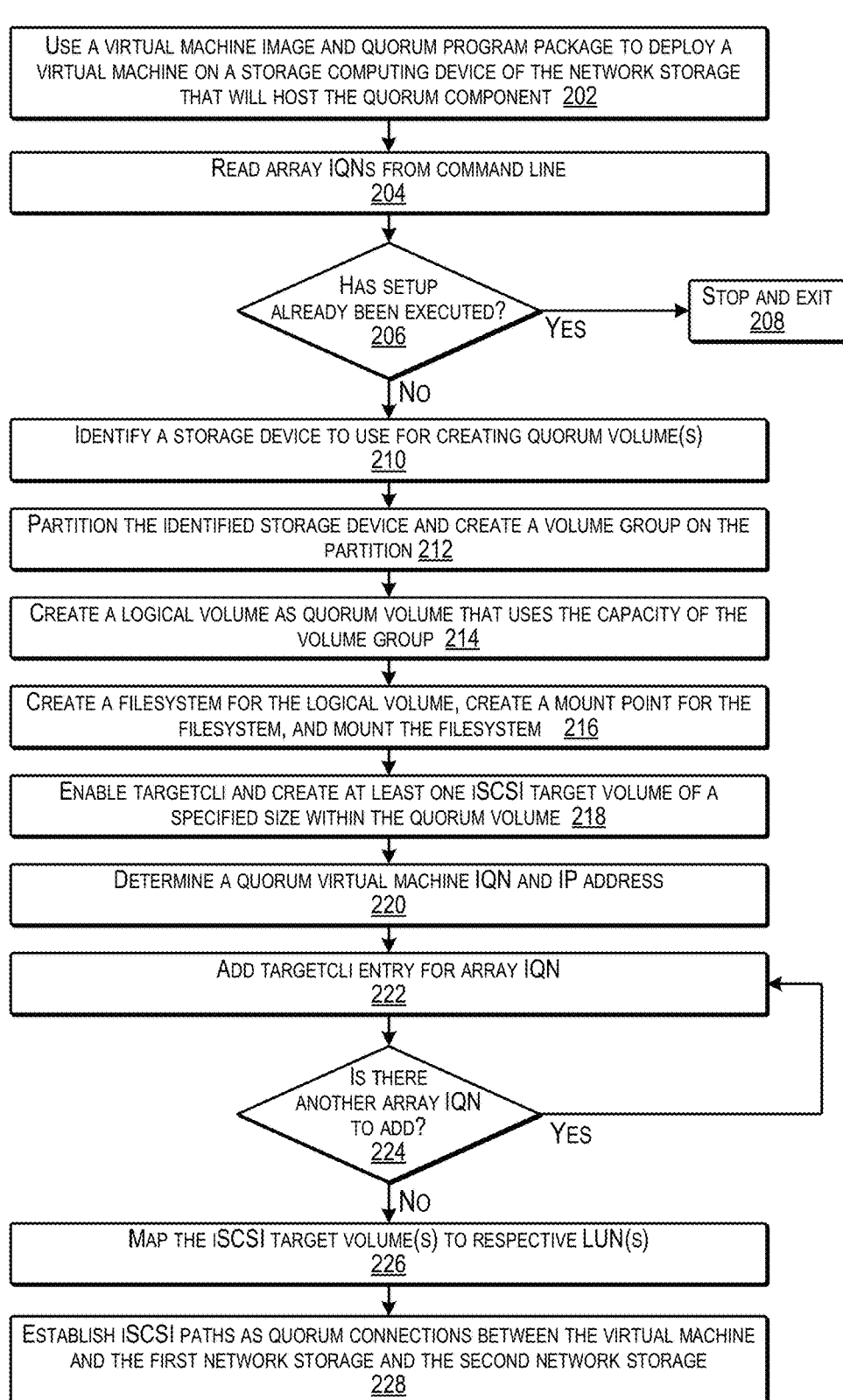

USE A VIRTUAL MACHINE IMAGE AND QUORUM PROGRAM PACKAGE TO DEPLOY A VIRTUAL MACHINE ON A STORAGE COMPUTING DEVICE OF THE NETWORK STORAGE THAT WILL HOST THE QUORUM COMPONENT  202

READ ARRAY IQNs FROM COMMAND LINE
204

HAS SETUP ALREADY BEEN EXECUTED?
206

STOP AND EXIT
208

YES

NO

IDENTIFY A STORAGE DEVICE TO USE FOR CREATING QUORUM VOLUME(S)
210

PARTITION THE IDENTIFIED STORAGE DEVICE AND CREATE A VOLUME GROUP ON THE PARTITION 212

CREATE A LOGICAL VOLUME AS QUORUM VOLUME THAT USES THE CAPACITY OF THE VOLUME GROUP 214

CREATE A FILESYSTEM FOR THE LOGICAL VOLUME, CREATE A MOUNT POINT FOR THE FILESYSTEM, AND MOUNT THE FILESYSTEM   216

ENABLE TARGETCLI AND CREATE AT LEAST ONE ISCSI TARGET VOLUME OF A SPECIFIED SIZE WITHIN THE QUORUM VOLUME  218

DETERMINE A QUORUM VIRTUAL MACHINE IQN AND IP ADDRESS
220

ADD TARGETCLI ENTRY FOR ARRAY IQN
222

IS THERE ANOTHER ARRAY IQN TO ADD?
224

YES

NO

MAP THE ISCSI TARGET VOLUME(S) TO RESPECTIVE LUN(S)
226

ESTABLISH ISCSI PATHS AS QUORUM CONNECTIONS BETWEEN THE VIRTUAL MACHINE AND THE FIRST NETWORK STORAGE AND THE SECOND NETWORK STORAGE
228

FIG. 2

ADMINISTRATIVE DEVICE
110

PROCESSOR(S)
802

COMMUNICATION INTERFACE(S)
806

COMPUTER-READABLE MEDIA
804

ADMINISTRATIVE APPLICATION
122

VIRTUAL MACHINE IMAGE AND QUORUM PROGRAM PACKAGE
509

INPUT/OUTPUT DEVICE(S)
808

CONFIGURING A QUORUM COMPONENT ON NETWORK STORAGE

TECHNICAL FIELD

This disclosure relates to the technical field of data storage.

BACKGROUND

Organizations and other entities may desire storage capabilities that minimize the risk of data loss. For example, when a disaster strikes, an organization may lose data as well as access to data, and thus, may lose the ability to function. Historically, storage solutions have emphasized reducing the time required to recover lost data from failed systems. Currently, however, there is significant pressure on organizations to implement recovery solutions that provide a very high probability of zero data loss. Further, the typical business procedures for recovering lost data manually after a disaster are becoming more difficult to implement as business transactions are increasingly performed entirely by computer. For many organizations, these risks are becoming unacceptable. Consequently, reducing the likelihood of permanent data loss and/or extended service outages has become a business priority.

SUMMARY

In some implementations, a computing device of a first network storage receives a virtual machine image and executable instructions for creating a quorum component for a second network storage and a third network storage that replicate data. The computing device implements the virtual machine on the computing device based on the virtual machine image. Further, based on implementing the virtual machine, the computing device executes the executable instructions to create a logical volume on a storage device associated with the computing device, and to create, in the logical volume, at least one target volume for receiving quorum information from the second network storage and/or the third network storage. Connections are established between the virtual machine and the second network storage and the third network storage for the virtual machine to receive quorum information. The virtual machine stores the quorum information in the at least one target volume.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a flow diagram illustrating an example process that may be executed for setting up a quorum component on a network storage according to some implementations.

DESCRIPTION OF THE EMBODIMENTS

Figure 1:
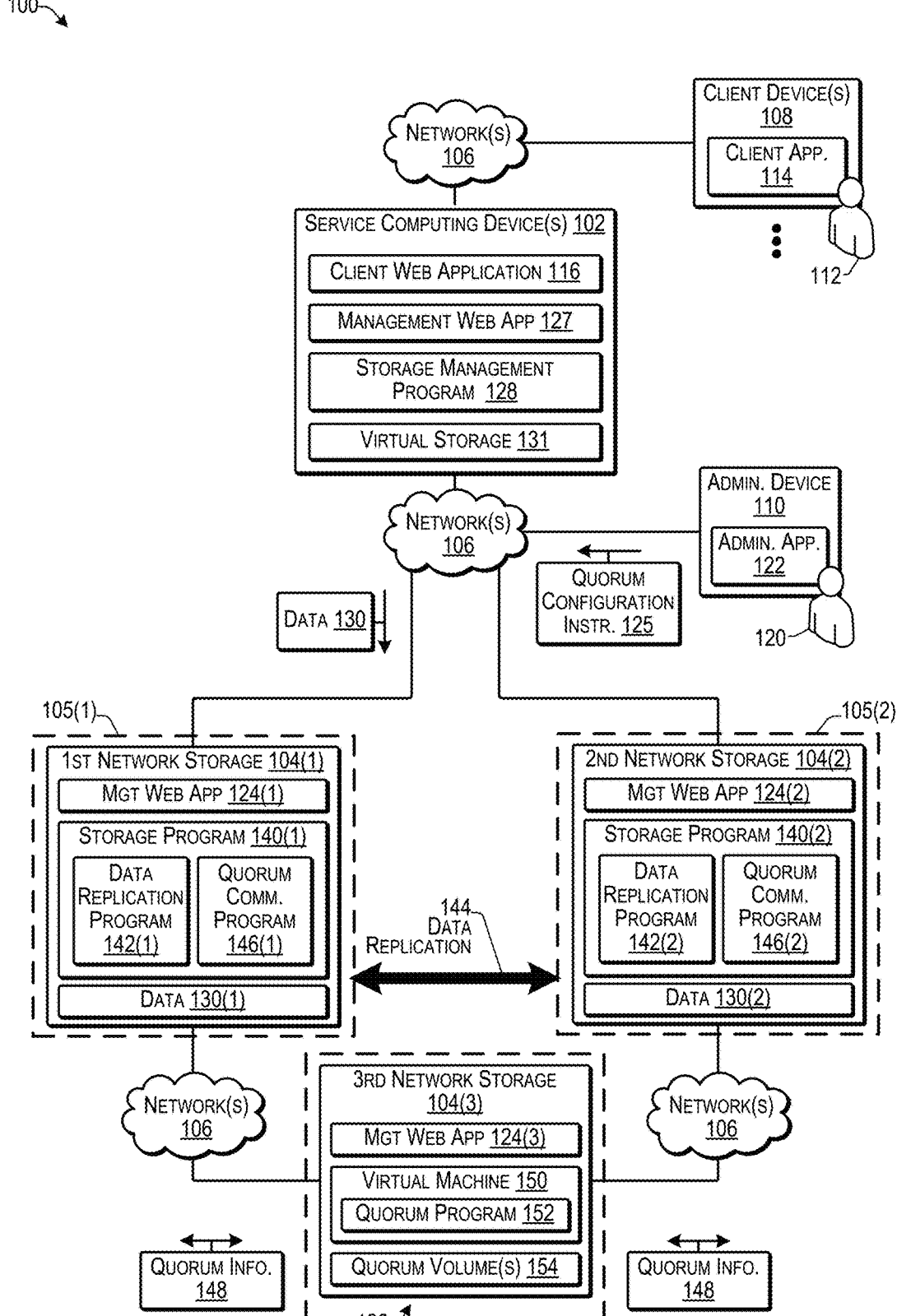
FIG. 1 illustrates an example architecture of a system able to store data to a plurality of network storages that utilize a quorum component according to some implementations.

Some implementations herein are directed to techniques and arrangements for deploying a virtual machine at a remote network storage and automatically configuring the virtual machine to provide a quorum component for use with data replication. For example, the techniques herein provide a quick and efficient process that can greatly reduce or eliminate user errors in remotely deploying and configuring a quorum component. Further, some examples provide a user interface that a user can utilize for creating and deleting quorum components, as well as for performing various other operations related to a quorum component.

In some examples, one or more service computing devices utilize a virtual storage that includes a plurality of network storages having underlying physical storage systems that perform asynchronous or synchronous data replication between the network storages. For instance, a first network storage may include a first physical storage system that is located at a first site at a first geographic location. A second physical storage system may include a second network storage that is located at a second site at a second geographic location that may be remote from the first geographic location. In some examples, the second geographic location may be sufficiently remote from the first geographic location, such as in another city, another state, another country, etc., that a disaster that affects the first network storage at that first geographic location is not likely to affect the second network storage at the second geographic location and vice versa. The first network storage and the second network storage may replicate data to each other to protect the data against data loss.

In addition, a quorum component may be established at a third network storage that includes a third physical storage system that is located at a third site at a third geographic location that is geographically remote from the first site and the second site. For instance, the quorum component may include at least one quorum volume that may store information to help maintain synchronous replicated copies of data volumes on the first and second network storages. As one example, each of the first network storage and the second network storage may access the quorum component to check on the status of each other. The quorum component may be used for detecting a replication failure between the first network storage and the second network storage, such as path failure, failure of one of the network storages, or the like. In some examples, the quorum component may reside on a virtual machine that is set up using a virtual machine image, which may include an operating system (OS) and a quorum setup and modification program. The quorum component herein may provide a geographically remote alternative to an on-premise quorum component, and thereby avoid a single point of failure.

Implementations herein enable remote configuration of a quorum component at a geographically distant site, with minimal commands and in a streamlined manner, while significantly reducing the likelihood of user errors being introduced during the configuration of the quorum component. In addition, the techniques herein can decrease the time required to deploy and configure a quorum volume to serve as a quorum component, and can reduce the overall effort and costs for setting up and operating a data replication solution. Further, implementations herein can ensure that the user sets up the proper volume size for the quorum component, ensure that the correct IP address is used in the configuration process, ensure that a qualified Internet Small Computer Systems Interface (iSCSI) name is used, and ensure that a proper partition is created when partitioning a volume to serve as the quorum volume. For example, as set forth in RFC 7143 IETF Trust, April 2014, by Chadalapaka, et al., iSCSI is an Internet Protocol (IP)-based storage networking standard for linking data storage facilities. iSCSI provides block-level access to storage devices by carrying SCSI commands over a TCP/IP network. The iSCSI protocol allows clients (aka "initiators") to send SCSI commands over a network to storage devices (targets) on remote computing devices.

For discussion purposes, some example implementations are described in the environment of one or more service computing devices in communication with a plurality of network storages that enable data replication and that communicate with a quorum component for maintaining data integrity and detecting failure. However, implementations herein are not limited to the particular examples provided, and may be extended to other types of computing system architectures, other types of storage environments, other types of client configurations, other types of data, and so forth, as will be apparent to those of skill in the art in light of the disclosure herein.

FIG. 1 illustrates an example architecture of a system 100 able to store data to a plurality of network storages that utilize a quorum component according to some implementations. The system 100 includes one or more service computing devices 102 that are able to communicate with, or otherwise coupled to a plurality of network storages 104, such as a first network storage 104(1) and a second network storage 104(2, such as through one or more networks 106. At least the first network storage 104(1) and the second network storage 104(2) are further able to communicate over the one or more networks 106 with a third network storage 104(3). The network storages 104(1)-104(3) may each include one or more computing devices (not shown in FIG. 1) that manage a plurality of designated storage devices separately from each of the other network storages 104(1)-104(3). For instance, the network storages 104 may include commercially available cloud storage available from various service providers such as AMAZON WEB SERVICES®, MICROSOFT AZURE®, GOOGLE CLOUD®, and so forth. Alternatively, in some examples, one or more of the network storages 104 may include privately owned storage systems. Example details of the network storages 104 are discussed below with respect to FIGS. 5 and 6.

Further, as mentioned above, the first network storage 104(1) may be physically located at a first site 105(1) at a first geographic location, and the second network storage 104(2) may be physically located at a second site at a second geographic location that is remote from the first geographic location. For instance, the second geographic location may be sufficiently remote from the first geographic location, such as in another city, another state, another country, etc., that a disaster that affects the first network storage 104(1) at that first site 105(1) is not likely to affect the second network storage 104(2) at the second site 105(2) and vice versa. Similarly, the third network storage 104(3) may be physically located at a third site 105(3) at a third geographic location that is geographically remote in the same manner from the first site 105(1) and the second site 105(2).

In some examples, the service computing device(s) 102 are able to communicate over the network(s) 106 with one or more client devices 108. For instance, the service computing device(s) 102 may be access nodes, server nodes, management nodes, and/or other types of service nodes that provide the client devices 108 with storage services for enabling the client devices 108 to store data, as well as performing other management and control functions, as discussed additionally below.

The network storages 104 and service computing device(s) 102 may also be able to communicate over the network(s) 106 with at least one administrative device 110. For example, the administrative device 110 may be used for configuring the network storages 104 and/or the service computing device(s) 102. The client device(s) 108 and the administrative device(s) 110 may be any of various types of computing devices, as discussed additionally below.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. As one example, the network(s) 106 may include a private network, such as a LAN, storage area network (SAN), or Fibre Channel network. Additionally, the network(s) 106 may include a public network that may include the Internet, or a combination of public and private networks. Implementations herein are not limited to any particular type of network as the networks 106.

In some examples, the service computing device(s) 102 may be configured to provide storage and data management services to client users 112 via the client device(s) 108, respectively. As several non-limiting examples, the client users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein. For instance, in some examples, the client devices 108 may not be included or may be entirely different types of client devices.

Each client device 108 may be any suitable type of computing device such as a desktop, laptop, tablet computing device, mobile device, smart phone, wearable device, terminal, and/or any other type of computing device able to send data over a network. Client users 112 may be associated with client device(s) 108 such as through a respective user account, user login credentials, or the like. Furthermore, the client device(s) 108 may be configured to communicate with the service computing device(s) 102 through the one or more networks 106, through separate networks, or through any other suitable type of communication connection. Numerous other variations will be apparent to those of skill in the art having the benefit of the disclosure herein.

In some implementations, each client device 108 may include a respective instance of a client application 114 that may execute on the client device 108, such as for communicating with a client web application 116 executable on the service computing device(s) 102, such as for sending user data for storage on the network storages 104 and/or for receiving stored data from the network storages 104 through a data instruction, such as a write operation, read operation, delete operation, or the like. In some cases, the application 114 may include a browser or may operate through a browser, while in other cases, the application 114 may include any other type of application having communication functionality enabling communication with the client web application 116 or other application on the service computing device(s) 102 over the one or more networks 106. Accordingly, the service computing device(s) 102 may provide storage for the respective client device(s) 108.

In addition, the administrative device 110 may be any suitable type of computing device such as a desktop, laptop, tablet computing device, mobile device, smart phone, wearable device, terminal, and/or any other type of computing device able to send data over a network. An administrator 120 may be associated with the administrative device 110, such as through a respective administrator account, administrator login credentials, or the like. Furthermore, the administrative device 110 may be able to communicate with the network storages 104 and the service computing device(s) 102 through the one or more networks 106, through separate networks, or through any other suitable type of communication connection.

Further, the administrative device 110 may include a respective instance of an administrator application 122 that may execute on the administrative device 110, such as for communicating with respective management web applications 124(1), 124(2) and 124(3) on the network storages 104(1), 104(2), and 104(3), such as for sending management instructions for managing the network storages 104, which may include sending quorum configuration instructions 125 for configuring a quorum component 126 on the third network storage 104(3), as well as configuring replication between the first network storage 104(1) and the second network storage 104(2) and configuring other storage functions on the network storages 104(1) and 104(2). Further, while a web application is described as one type of application providing remote management functionality to the administrative device 110, any of numerous other types of software arrangements may be employed for performing these functions, as will be apparent to those of skill in the art having the benefit of the disclosure herein.

In addition, the service computing device(s) 102 may also include a management web application 127 or other application to enable the administrative device 110 to configure operations performed by the service computing device(s) 102. In some cases, the administrator application 122 may include a browser or may operate through a browser, while in other cases, the administrator application 122 may include any other type of application having communication functionality enabling communication with the management web applications 124, 127 or other applications on the network storages 104 or the service computing device(s) 102 over the one or more networks 106.

The service computing device(s) 102 may execute a storage management program 128, which may provide access to the network storages 104(1) and 104(2), such as for sending data 130 to be stored to the network storages 104(1) and/or 104(2) and for retrieving requested data 130 from the network storages 104(1) and/or 104(2). Furthermore, the storage management program 128 may present a virtual storage 131 to the client devices 108. For example, the virtual storage 131 may be based on the physical storage actually provided by the network storages 104(1) and 104(2), and may be virtual in the sense that the virtual storage 131 is presented as being locally available to the service computing device 102. In addition, the storage management program 128 may manage the data 130 stored by the system 100, such as for managing data retention periods, data protection levels, data replication, and so forth.

The network storages 104(1) and 104(2) may execute instances of a storage program 140(1) and 140(2), respectively, for managing storage of respective data 130(1) and 130(2) at the respective network storages 104(1) and 104(2). For instance, the storage program 140 may receive data 130 from the storage management program 128 at the service computing device(s) 102, may store the data 130 on one or more storage devices at the network storage 104, and may retrieve and send requested data to the storage management program 128, such as in response to a client read request, or the like. The storage program 140 may also provide information to the storage management program 128 and/or the administrator application 122, such as performance information, capacity usage information, and so forth for the respective storage devices managed by the particular storage program 140 on a particular one of the network storages 104.

In addition, the storage programs 140(1) and 140(2) may include, may execute, may access, or may otherwise coexist with data replication programs 142(1) and 142(2), respectively, that are configured to perform data replication 144 between the first network storage 104(1) and the second network storage 104(2). For example, the data replication programs 142(1) and 142(2) may configure the network storages 104(1) and 104(2) to perform asynchronous or synchronous data replication between the first network storage 104(1) and the second network storage 104(2). In addition, the first network storage 104(1) and the second network storage 104(2) may each include a quorum communication program 146(1) and 146(2), respectively, for communicating over the one or more networks 106 with the quorum component 126 on the third network storage 104(3). In some cases, the first network storage 104(1) and the second network storage 104(2) may communicate with the quorum component 126 through a virtual private network (VPN) or the like, such as for sending and/or receiving quorum information 148.

As mentioned above, such as when setting up the quorum component 126 on the third network storage 104(3), the administrative device 110 may send quorum configuration instructions 125 to the third network storage 104(3) to set up and configure a virtual machine 150 on the third network storage 104(3) for hosting the quorum component 126. When the virtual machine 150 has been implemented on the third network storage 104(3), a quorum program 152 may execute on the virtual machine to configure one or more quorum volumes 154. In this example, the quorum component 126 includes the one or more quorum volumes 154 and the virtual machine 150 configured as an iSCSI target of the network storages 104(1) and 104(2). For example, the quorum program 152 may include a BASH script that is executed upon initiation of the virtual machine 150 to set up at least one quorum volume 154 that can receive quorum information 148 from the first network storage 104(1) and the second network storage 104(2). BASH is a UNIX shell and command language. Consequently, the administrative user 120 does not have to manually enter configuration information at the administrative device 110, which can prevent misconfiguration of the quorum volume 154, and thereby may prevent unnecessary usage of excess storage space by the quorum volume 154 or other improper configurations of the quorum volume 154.

In addition, the virtual machine 150 may be configured as an iSCSI target for communicating with the first network storage 104(1) and the second network storage 104(2). As one nonlimiting example, the virtual machine 150 may be implemented using a version of the LINUX® operating system and may be configured as a LINUX SCSI target. As one example, a software such as targetcli, may be employed by the quorum program 152 for configuring the virtual machine 150 as the iSCSI target. For instance, targetcli is a single-node LINUX IO management shell developed by Datera, Inc. of Santa Clara, CA, USA.

As discussed additionally below, the quorum program 152 also includes instructions for generating and presenting a user interface to enable the administrative user 120 to manage the quorum component 126. For example, the quorum program 152 may provide functionality in the user interface for enabling operations such as adding a quorum volume, deleting a quorum volume, adding an IQN (iSCSI Qualified Name) node, deleting an IQN node, refreshing a current portal, enabling Challenge-Handshake Authentication Protocol (CHAP) authentication, viewing a current configuration, and so forth. Additional details of the user interface and the functions performed thereby are discussed below, e.g., with respect to FIGS. 3 and 4.

Figure 3:
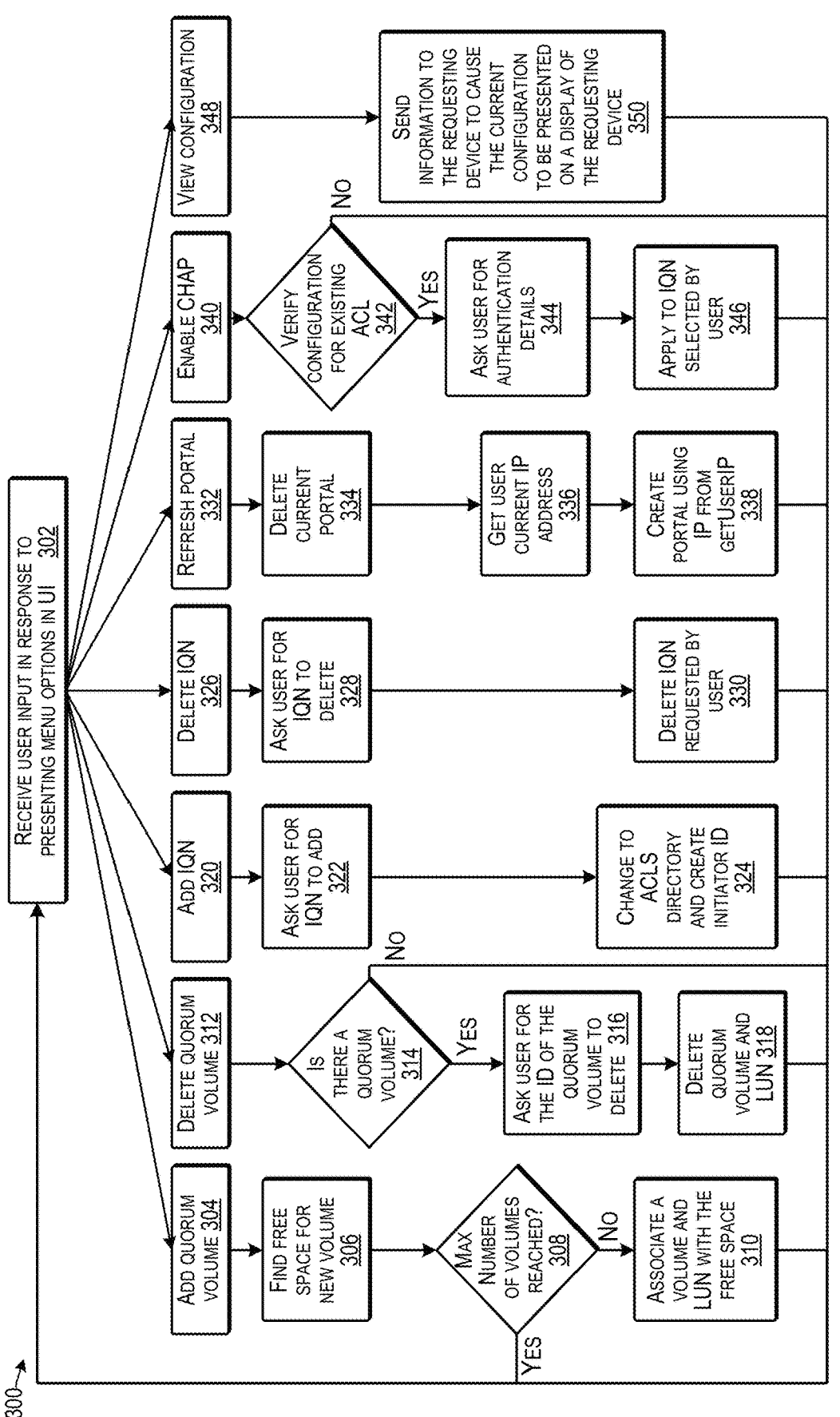
FIG. 3 is a flow diagram illustrating an example process that includes interaction with a quorum component according to some implementations.

FIGS. 2 and 3 are flow diagrams illustrating an example process 200 for optimizing and controlling traffic distribution according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 2 is a flow diagram illustrating an example process 200 that may be executed for setting up a quorum component on a network storage according to some implementations. In some cases, the process 200 may be executed at least in part by the network storage 104(3), such as by a computing device of the network storage 104(3) setting up the virtual machine 150 and executing the quorum program 152. As one example, the virtual machine 150 may be set up on the computing device and may then execute the quorum program 152.

At 202, the computing device of the target network storage 104(3) may use a virtual machine image and quorum program package to deploy a virtual machine on the computing device. For example, the virtual machine image and quorum program package may be obtained from a repository associated with the network storage 104(3), such as a cloud marketplace or other repository. For instance, the administrative device 110 may interact with the management web application 124(3) on the computing device of the third network storage 104(3) to initiate deployment of the virtual machine, such as discussed above with respect to FIG. 1. Alternatively, in other examples, the virtual machine image and quorum program package may be uploaded from the administrative device 110. In some examples, the virtual machine may be implemented as a LINUX® server, but implementations herein are not limited to any particular operating system or type of virtual machine. Furthermore, the virtual machine image may include preset specifications for the virtual machine such as an amount of memory to be allocated, processor specifications, storage capacity to be allocated, and so forth.

At 204, following launch of the virtual machine, the computing device may initiate setup of the quorum component by reading array IQNs (iSCSI Qualified Names) of the iSCSI ports of the first network storage and the second network storage user data. For instance, after the user inputs the IQN information into a user data box, the virtual machine may execute a BASH script that downloads required packages, enables targetcli, and executes commands for configuring the virtual machine to serve as part of a quorum component. For instance, the quorum program 152 may receive a user input or other user data for acquiring the IQNs of the iSCSI ports on the storage arrays, i.e., the first network storage 104(1) and the second network storage 104(2).

At 206, after the IQN information is received, the computing device may determine whether a quorum component setup has already been executed. If so, the process goes to 208. If not, the process goes to 210.

At 208, if a quorum component setup has already been executed, the computing device may stop and exit execution of the setup process.

At 210, if the quorum component setup has not already been executed, the computing device may identify a disk for creating the quorum volume.

At 212, the computing device may partition the identified disk to create a new partition of at least a threshold size, and create a volume group on the new partition.

At 214, the computing device may create a logical volume as a quorum volume that uses the capacity of the volume group. For example, the logical volume may span 100 percent of the capacity of the volume group.

At 216, the computing device may create a filesystem for the quorum volume, may create a mount point for the filesystem, and may mount the filesystem.

At 218, the computing device may enable targetcli and may create at least one iSCSI target volume of a specified size within the quorum volume. As several nonlimiting examples, the iSCSI target volume size may be 10 GB, 13 GB, 15 GB, etc., in some applications.

At 220, the computing device may identify a quorum virtual machine IQN and an IP address for the virtual machine.

At 222, the computing device may add a targetcli entry for an array IQN. For instance, the first network storage 104(1) and the second network storage 104(2) may each have their own array IQN.

At 224, the computing device may determine whether there is another array IQN to add. If so, the process returns to 222. If not, the process proceeds to 226. For example, when there are two network storages 104(1) and 104(2) that will use the quorum volume, two array IQNs are entered.

At 226, the computing device may map the iSCSI target volume(s) to respective LUN(s).

At 228, iSCSI paths may be established as quorum connections between the virtual machine 150 and the first network storage 104(1) and the second network storage 104(2), such as through respective VPNs or the like.

The foregoing process 200 significantly simplifies the process of configuring a quorum component on a cloud storage or other network storage 104 by deploying a virtual machine image with preset specifications (e.g., memory, CPU, storage size) directly from a service provider market-place or other repository, and executing the quorum setup program remotely on the designated computing device with the virtual machine. The process minimizes user inputs and avoids the command line during setup, and the user per-forming the setup does not need to learn any new interfaces to perform the initial setup of the quorum component. For instance, the process may use user data to determine an IQN, and the user does not need to input any commands since the setup process is automated, such as by a BASH script that gets executed as part of the quorum program 152 upon launch of the virtual machine image.

FIG. 3 is a flow diagram illustrating an example process 300 that includes interaction with a quorum component according to some implementations. In some examples, the process 300 may be executed by a computing device of the network storage 104(3), such as by execution of the quorum program on the virtual machine deployed on the computing device of the network storage 104(3).

At 302, the computing device may receive user input in response to presenting menu options in a user interface. For example, the computing device may cause a user interface to be presented on the administrative device 110 for receiving or more inputs to the user interface.

At 304, when the input is a command to add a quorum volume, the process proceeds to 306.

At 306, the computing device may find free space in storage for the new quorum volume.

At 308, the computing device may determine whether the maximum number of volumes has been reached. If so, the process returns to 302. If not, the process proceeds to 310.

At 310, the computing device associates a volume and a corresponding LUN with the free space to provide a new quorum volume. In some examples, the new quorum volume may be generated as described above with respect to FIG. 2.

At 312, when the input is a command to delete a quorum volume, the process goes to 314.

At 314, the computing device determines whether there is a quorum volume. If so the process goes to 316. If not, the process returns to 302.

At 316, when there is an existing quorum volume, the computing device asks the user for the ID of the quorum volume to delete.

At 318, in response to receiving the ID of the quorum volume, the computing device deletes the quorum volume and the corresponding LUN.

At 320, when the input is a command to add an IQN, the process goes to 322.

At 322, the computing device asks the user for the IQN to be added.

At 324, the computing device changes to an active control lists (ACLs) directory and creates an iSCSI initiator ID. For instance, an initiator ID enables the computing device to send data to an external iSCSI storage array, such as through a Transmission Control Protocol (TCP)-based Internet Pro-tocol (IP) network.

At 326, when the input is a command to delete an IQN, the process goes to 328.

At 328, the computing device asks the user for the IQN to delete.

At 330, the computing device deletes the IQN requested to be deleted by the user.

At 332, when the input is a command to refresh the portal, the process goes to 334.

At 334, the computing device deletes the current portal.

At 336, the computing device gets the user's current IP address. For example, the computing device may use a getUserIP command to obtain the IP address of the user.

At 338, the computing device creates a portal using the IP address obtained through the getUserIP command.

At 340, when the input is a command to enable Chal-lenge-Handshake Authentication Protocol (CHAP), the pro-cess goes to 342. For example, CHAP authenticates an administrative user to an authenticating entity, such as the service provider of the network storage 104(3) on which the quorum component is located. CHAP may provide protec-tion against certain types of hacking attacks and may pro-vide better security than a plain password authentication protocol.

At 342, the computing device may verify the configura-tion for the existing ACL.

At 344, the computing device may ask the user for authentication details.

At 346, the computing device may apply the CHAP security to the IQN selected by the user. For example, the virtual machine may automate the process of enabling CHAP authentication by allowing the user to have a set of authentication keys apply to all quorums or to specific quorum volumes.

At 348, when the input is a command to view the current configuration of the quorum component, the process goes to 350.

At 350, the computing device may send information to the requesting device to cause the current configuration to be presented on a display of the requesting device. For example, the computing device may perform parsing to get information about the configuration in order to streamline the process of making any changes to the configuration. The virtual machine may automate any changes by enabling the user to select an option from a menu and having a bash script execute commands a user would usually have to do manu-ally The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementa-tions, as would be known or as would become known to those skilled in the art.

Figure 4:
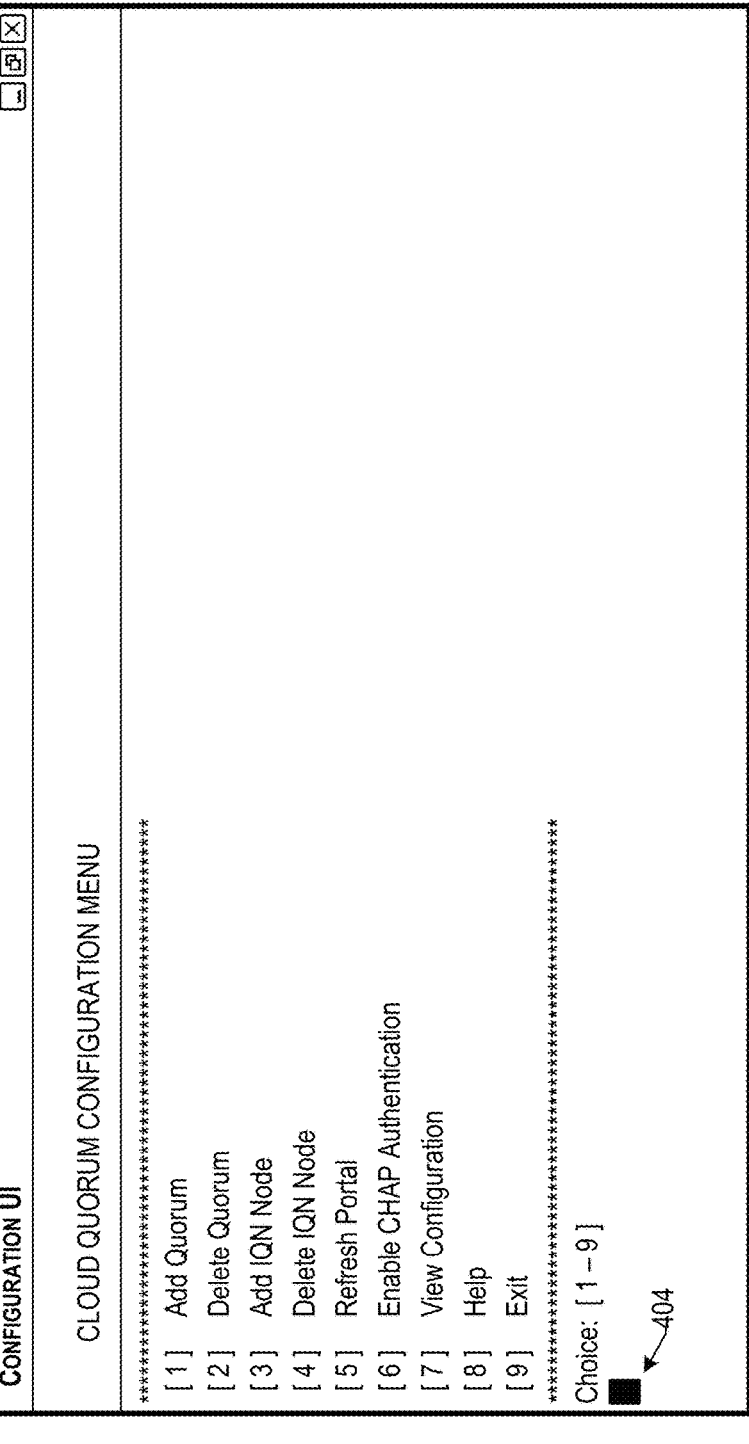
FIG. 4 illustrates an example user interface that may be used for configuring a quorum component according to some implementations.

FIG. 4 illustrates an example user interface 400 that may be used for configuring a quorum component according to some implementations. As one example, the user interface 400 may be presented on a display of the administrative device 110 based on information received from the quorum program executing on the computing device of the network storage 104(3). In this example, the user interface is a command line interface; however, in other examples, the user interface may be a graphical user interface, touch screen user interface, or the like.

The user interface 400 includes a plurality of commands 1-9 that may be selected by a user input at a cursor prompt 404. Commands [1]-[7] correspond to the commands 304, 312, 320, 326, 332, 340, and 348, respectively, discussed above with respect to FIG. 3. For example, if the user enters a "1" at the command prompt 404, blocks 306 through 310 of FIG. 3 may be executed. Similarly, if the user enters a "2" at the command prompt 404, blocks 314-318 of FIG. 3 may be executed, and so forth. Accordingly, the implementations herein provide a user interface 400 that includes a plurality of options for automated post-deployment configuration of a quorum component through use of a menu for selecting desired configuration options.

In addition, the user interface 400 includes a help command, corresponding to command number [8], which may be entered at the command prompt 404 to access a help menu. Furthermore, the user interface 400 includes an exit command [9], which may be entered at the command prompt 404 to exit the user interface 400. Furthermore, while an example of a user interface is set forth with respect to FIG. 4, numerous variations will be apparent to those of skill in the art having the benefit of the disclosure herein.

Figure 5:
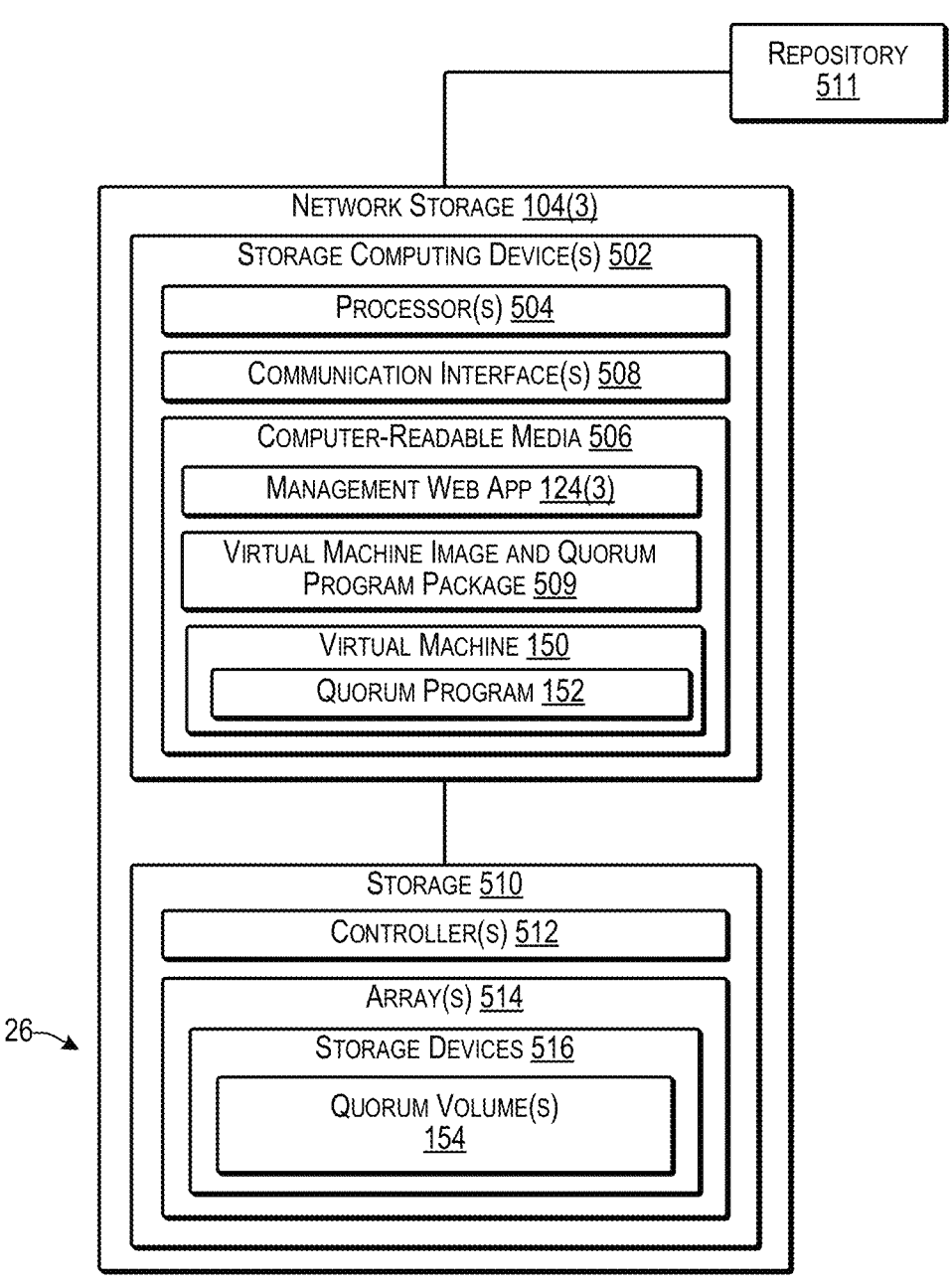
FIG. 5 illustrates select components of an example configuration of a network storage with a quorum component according to some implementations.

FIG. 5 illustrates select components of an example configuration of the network storage 104(3) with a quorum component 126 according to some implementations. In this example, the network storage 104(3) may include one or more storage computing devices 502, which may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple storage computing device(s) 502 may be located together or separately, and organized, for example, as virtual servers, server banks, and/or server farms. The described functionality may be provided by the servers of a single entity or enterprise, or may be provided by the servers and/or services of multiple different entities or enterprises. The storage computing device(s) 502 may each include one or more processors 504, one or more computer-readable media 506, and one or more communication interfaces 508. The storage computing device(s) 502 may communicate with a storage 510, as discussed additionally below.

Each processor 504 may be a single processing unit or a number of processing units, and may include single or multiple computing units, or multiple processing cores. The processor(s) 504 can be implemented as one or more central processing units, microprocessors, microcomputers, microcontrollers, digital signal processors, state machines, logic circuitries, and/or any devices that manipulate signals based on operational instructions. As one example, the processor(s) 504 may include one or more hardware processors and/or logic circuits of any suitable type specifically programmed or configured to execute the algorithms and processes described herein. The processor(s) 504 may be configured to fetch and execute computer-readable instructions stored in the computer-readable media 506, which may program the processor(s) 504 to perform the functions described herein.

The computer-readable media 506 may include volatile and nonvolatile memory and/or removable and non-removable media implemented in any type of technology for storage of information, such as computer-readable instructions, data structures, program modules, or other data. For example, the computer-readable media 506 may include, but is not limited to, RAM, ROM, EEPROM, flash memory or other memory technology, optical storage, solid state storage, magnetic disk storage, or any other medium that can be used to store the desired information and that can be accessed by a computing device. Depending on the configuration of the storage computing device(s) 502, the computer-readable media 506 may be a tangible non-transitory medium to the extent that, when mentioned, non-transitory computer-readable media exclude media such as energy, carrier signals, electromagnetic waves, and/or signals per se. In some cases, the computer-readable media 506 may include a portion of storage in the storage 510 discussed below.

The computer-readable media 506 may be used to store any number of functional components that are executable by the processor(s) 504. In many implementations, these functional components comprise instructions or programs that are executable by the processor(s) 504 and that, when executed, specifically program the processor(s) 504 to perform the actions attributed herein to the storage computing device 502. Functional components stored in the computer-readable media 506 may include the management web application 124(3), a virtual machine image and quorum program package 509, a virtual machine that may be established based on the a virtual machine image and quorum program package 509, and the quorum program 152, each of which may include one or more computer programs, applications, executable code, executable scripts, or portions thereof. Further, while these programs are illustrated together in this example, during use, some or all of these programs may be executed on separate storage computing device(s) 502.

As one example, the virtual machine image and quorum program package 509 may be obtained by the administrative user 120 from a repository associated with the third network storage 104(3). For instance, the third network storage 104(3) may include the virtual machine image and quorum program package 509 in a virtual marketplace or other repository 511, or the like, that enables users to access program packages for use at the third network storage 104(3). In some cases, the repository 511 may be located at the same site 105(3) as the network storage 104(3) and may be associated with a service provider that also provides the network storage as a service. In other cases, the repository 511 may be located remotely from the network storage 104(3) and the site 105(3), and may be associated with a different service provider. In either situation, the administrative user 120 discussed above with respect to FIG. 1, may use the repository 511 to access the virtual machine image and quorum program package 509 to install the virtual machine 150 and quorum program 152 on a designated storage computing device 502 at the network storage 104(3). Alternatively, as another example, the virtual machine image and quorum program package 509 may be uploaded by the administrative user 120 such as from the administrative device 110. The virtual machine image and quorum program package 509 may include an operating system image for installing the virtual machine 150 on the storage computing device 502. Further, the virtual machine 150 may host the quorum program 152 and may enable the quorum program 152 to execute for automatically setting up the quorum volume 154 on the storage 510.

In addition, the storage computing device 502 may also include or maintain other functional components and data, which may include programs, drivers, etc., and the data used or generated by the functional components. Further, the storage computing device 502 may include many other logical, programmatic, and physical components, of which those described above are merely examples that are related to the discussion herein.

The one or more communication interfaces 508 may include one or more software and hardware components for enabling communication with various other devices, such as over the one or more network(s) 106. For example, the communication interface(s) 508 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The storage 510 associated with the network storage 104(3) may include one or more controllers 512 associated with the storage 150 for storing the one or more quorum volumes 154 as one or more quorum components 126 on one or more trays, racks, extent groups, or other types of arrays 514 of storage devices 516. For instance, the controller 152 may control the arrays 514, such as for configuring the arrays 514, such as in an erasure coded protection configuration, or any of various other configurations, such as a RAID configuration, JBOD configuration, or the like, and/or for presenting storage extents, logical units, or the like, based on the storage devices 516, and for managing data stored on the underlying physical storage devices 516. The storage devices 516 may be any type of storage device, such as hard disk drives, solid state drives, optical drives, magnetic tape, combinations thereof, and so forth.

Figure 6:
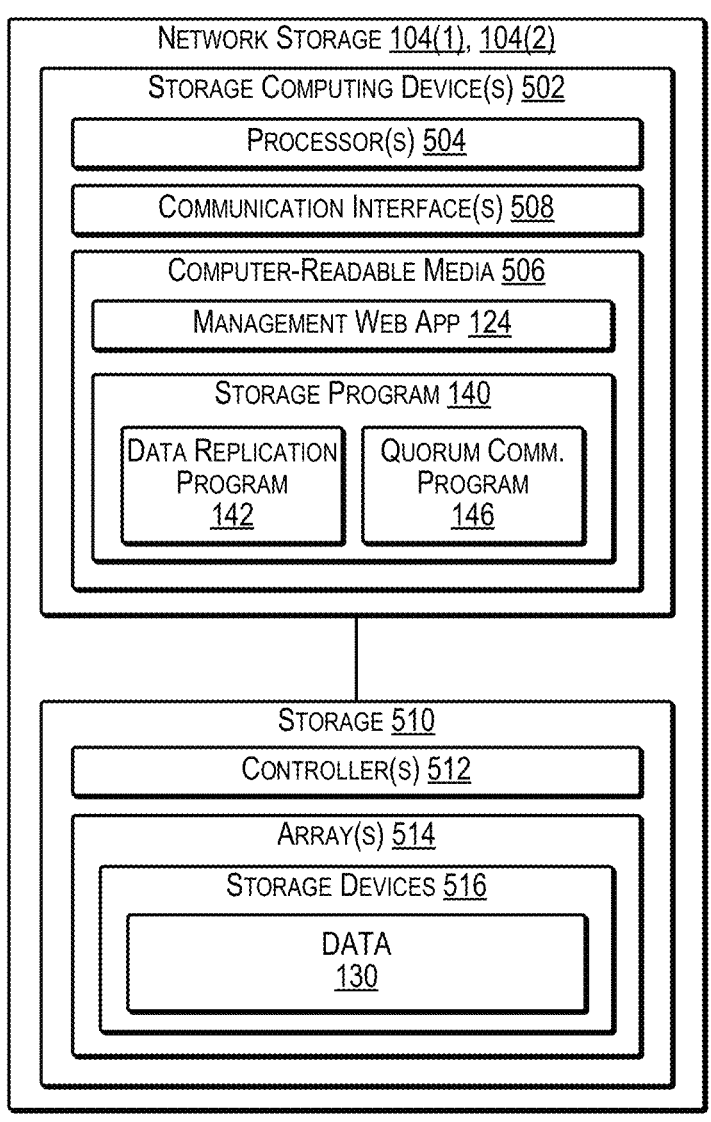
FIG. 6 illustrates select components of an example configuration of the network storages that perform replication according to some implementations.

FIG. 6 illustrates select components of an example configuration of the network storages 104(1) and 104(2) that perform replication according to some implementations. The network storages 104(1) and 104(2) may include a hardware configuration similar to that discussed above with respect to the network storage 104(3) in FIG. 5, but may include different functional components and data. For instance, as illustrated, functional components stored in the computer-readable media 506 of the network storages 104(1) and 104(2) may include the management web application 124 and the storage program 140, which may include the data replication program 142 and the quorum communication program 146, each of which may include one or more computer programs, applications, executable code, executable scripts, or portions thereof. Further, while these programs are illustrated together in this example, during use, some or all of these programs may be executed on separate storage computing device(s) 502.

For example, the storage program 140 may be executed by the one or more processors 504 for managing the storage of the data 130 on the storage 510 associated with the respective network storages 104(1) or 104(2). For instance, the controller 152 may control the arrays 514, such as for configuring the arrays 514, such as in an erasure coded protection configuration, or any of various other configurations, such as a RAID configuration, JBOD configuration, or the like, for presenting, to the storage program 140, storage extents, logical units, or the like, for managing the data 130 stored on the underlying physical storage devices 516. The storage devices 516 may be any type of storage device, such as hard disk drives, solid state drives, optical drives, magnetic tape, combinations thereof, and so forth.

Figure 7:
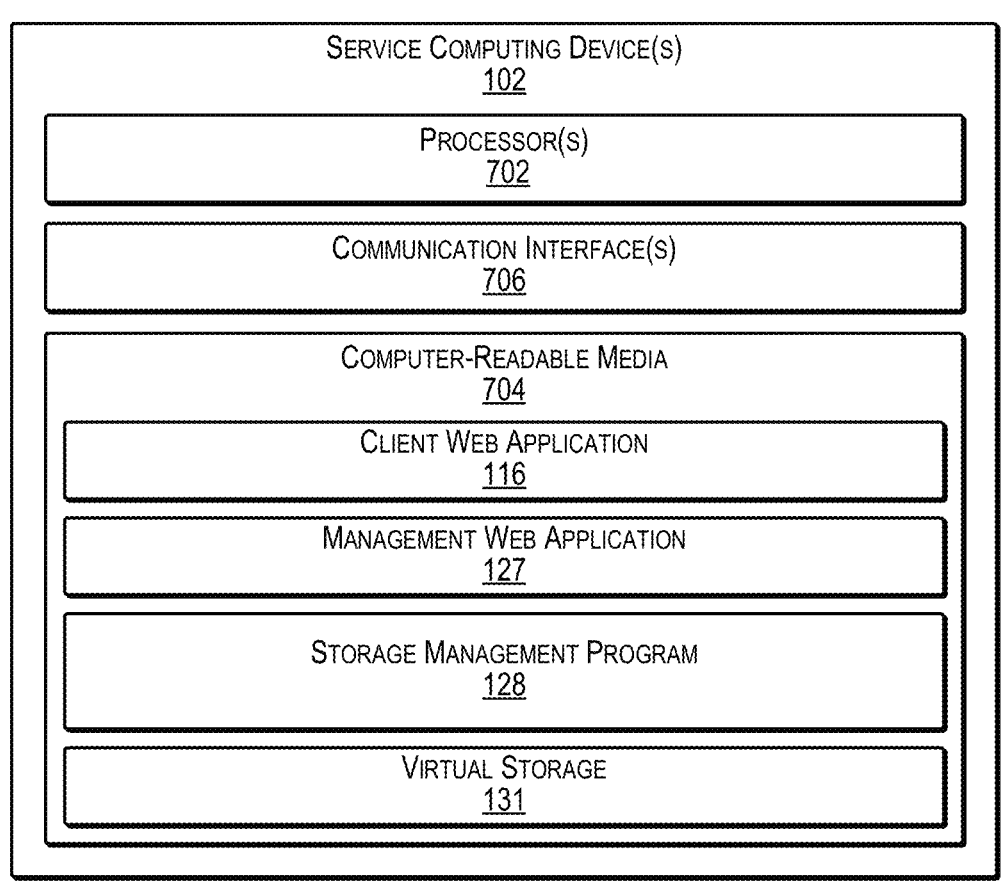
FIG. 7 illustrates select example components of one or more service computing devices that may be used to implement some of the functionality of the systems described herein.

FIG. 7 illustrates select example components of one or more service computing devices 102 that may be used to implement some of the functionality of the systems described herein. The service computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing device(s) 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device (s) 102 includes, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more central processing units, microprocessors, microcomputers, microcontrollers, digital signal processors, graphics processing units, state machines, logic circuitries, and/or any devices that manipulate signals based on operational instructions. As one example, the processor(s) 702 may include one or more hardware processors and/or logic circuits of any suitable type specifically programmed or configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. For example, the computer-readable media 704 may include, but is not limited to, RAM, ROM, EEPROM, flash memory or other memory technology, optical storage, solid state storage, magnetic tape, and magnetic disk storage, or any other medium that can be used to store the desired information and that can be accessed by a computing device. Further, in some examples, the computer-readable media 704 includes the network storages 104(1) and 104(2), which may include storage arrays, network attached storage, storage area networks, cloud storage, and the like, as described elsewhere herein.

Depending on the configuration of the service computing device(s) 102, the computer-readable media 704 may be a tangible non-transitory medium to the extent that, when mentioned, non-transitory computer-readable media exclude media such as energy, carrier signals, electromagnetic waves, and/or signals per se. In some cases, the computer-readable media 704 may be at the same location as the service computing device 102, while in other examples, the computer-readable media 704 may be partially remote from the service computing device 102.

The computer-readable media 704 may be used to store any number of functional components that are executable by the processor(s) 702. In many implementations, these functional components comprise instructions or programs that are executable by the processor(s) 702 and that, when executed, specifically program the processor(s) 702 to perform the actions attributed herein to the service computing device 102. Functional components stored in the computer-readable media 704 may include the client web application 116, the management web application 127, and the storage management program 128, each of which may include one or more computer programs, applications, executable code, or portions thereof. Further, while these programs are illustrated together in this example, during use, some or all of these programs may be executed on separate service computing device(s) 102.

In addition, the computer-readable media 704 may store data, data structures, and other information used for performing the functions and services described herein. For example, the computer-readable media 704 may store one or more data structures that contain metadata or other information for providing the virtual storage 131. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 706 may include one or more software and hardware components for enabling communication with various other devices, such as over the one or more network(s) 106. For example, the communication interface(s) 706 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Figure 8:
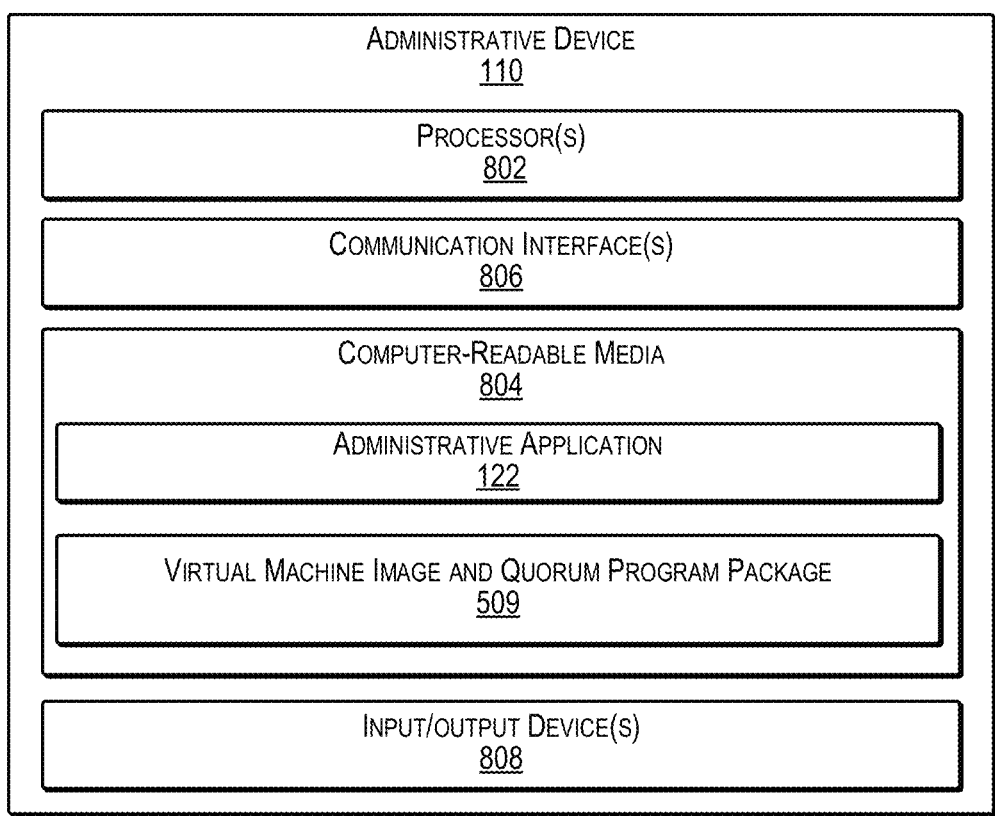
FIG. 8 illustrates select example components of an administrative device according to some implementations.

FIG. 8 illustrates select example components of an administrative device 110 according to some implementations. The administrative device 110 may include any of a number of different types of computing devices such as a desktop, laptop, tablet computing device, mobile device, smart phone, wearable device, terminal, workstation, server, and/or any other type of computing device able to send data over a network.

In the example of FIG. 8, the administrative device 110 includes components such as at least one processor 802, one or more computer-readable media 804, one or more communication interfaces 806, and one or more input/output (I/O) devices 808. Each processor 802 may itself comprise one or more processors or processing cores. For example, the processor(s) 802 can be implemented as one or more microprocessors, microcomputers, microcontrollers, digital signal processors, central processing units, graphics processors, state machines, logic circuitries, and/or any devices that manipulate signals based on operational instructions. In some cases, the processor(s) 802 may be one or more hardware processors and/or logic circuits of any suitable type specifically programmed or configured to execute the algorithms and processes described herein. The processor(s) 802 can be configured to fetch and execute computer-readable processor-executable instructions stored in the computer-readable media 804.

Depending on the configuration of the administrative device 110, the computer-readable media 804 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 804 may include, but is not limited to, RAM, ROM, EEPROM, flash memory, solid-state storage, magnetic disk storage, optical storage, and/or other computer-readable media technology. Further, in some cases, the administrative device 110 may access external storage, such as storage arrays, network attached storage, storage area networks, cloud storage, or any other medium that can be used to store information and that can be accessed by the processor(s) 802 directly or through another computing device or network. Accordingly, the computer-readable media 804 may be computer storage media able to store instructions, modules or components that may be executed by the processor(s) 802. Further, when mentioned, non-transitory computer-readable media exclude media such as energy, carrier signals, electromagnetic waves, and signals per sc.

The computer-readable media 804 may be used to store and maintain any number of functional components that are executable by the processor 802. In some implementations, these functional components comprise instructions or programs that are executable by the processor 802 and that, when executed, implement operational logic for performing the actions and services attributed above to the administrative device 110. Functional components of the administrative device 110 stored in the computer-readable media 804 may include the administrative application 122, as discussed above, which may enable the administrative device 110 to interact with the network storages 104 and the service computing device(s) 102.

In addition, the computer-readable media 804 may also store data, data structures and the like, that are used by the functional components. In some examples, the administrative device 110 may store a copy of the virtual machine image and quorum program package 509, which may be uploaded by the administrative device 110 to the third network storage 104(3), such as in the case that this program package 509 is not available at a repository of the third network storage 104(3). Depending on the type of the administrative device 110, the computer-readable media 804 may also optionally include other functional components and data, such as other modules and data 812, which may include applications, programs, drivers, etc., and the data used or generated by the functional components. Further, the administrative device 110 may include many other logical, programmatic and physical components, of which those described are merely examples that are related to the discussion herein.

The communication interface(s) 806 may include one or more interfaces and hardware components for enabling communication with various other devices, such as over the network(s) 106 or directly. For example, communication interface(s) 806 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The administrative device 110 may further include the one or more I/O devices 808. The I/O devices 808 may include a display for presenting the user interface 400 to the administrative user 120. In some examples, the display may include a touchscreen as an input device. The I/O devices 108 may further include speakers, a microphone, a camera, and various user controls (e.g., buttons, a joystick, a keyboard, a keypad, touchpad, mouse, etc.), a haptic output device, and so forth. Additionally, the administrative device 110 may include various other components that are not shown, examples of which include removable storage, a power source, such as a battery and power control unit, and so forth. Further, the client computing device(s) 108 may include hardware structures and components similar to those described for the administrative device 110, but with one or more different functional components.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, scripts, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first network storage including a computing device able to communicate with a second network storage and a third network storage over one or more networks, wherein data is replicated between the second network storage and the third network storage, the computing device configured to perform operations comprising:
   receiving, by the computing device, a virtual machine image, the virtual machine image including an operating system, preset processor specification, and preset memory specification for creating a virtual machine on the computing device, and executable instructions to be executed by the virtual machine for creating a quorum component, wherein the quorum component is configured to store replication status information of the second network storage and the third network storage related to replication of the data between the second network storage and the third network storage, the quorum component enabling both the second network storage and the third network storage to access the quorum component for checking a status of other of the second network storage and the third network storage;
   implementing, by the computing device, the virtual machine on the computing device based on receiving the virtual machine image;
   based at least on the computing device implementing the virtual machine, executing, by the virtual machine, the executable instructions for creating the quorum component including:

creating a logical volume on a storage device associated with the computing device;
creating, in the logical volume, a target volume for receiving and storing the replication status information from the second network storage and the third network storage, wherein the replication status information indicates a status of the replication of the data between the second network storage and the third network storage;
establishing a first connection between the virtual machine and the second network storage to receive first quorum replication status information from the second network storage, and establishing a second connection between the virtual machine and the third network storage to receive second replication status information from the third network storage; and
storing, by the virtual machine, the first replication status information and the second replication status information in the target volume for enabling the second network storage and the third network storage to check the replication status of the other of the second network storage and the third network storage.

2. The system as recited in claim 1, the operations further comprising:
receiving the virtual machine image and executable instructions for creating the quorum component from a repository associated with a service provider associated with the first network storage.

3. The system as recited in claim 1, the operations further comprising executing, by the virtual machine, the executable instructions to:
prior to creating the logical volume, identify a storage device to use for creating the logical volume;
partitioning the storage device to create a partition; and
creating the logical volume on the partition.

4. The system as recited in claim 1, the operations further comprising executing, by the virtual machine, the executable instructions to:
create a filesystem for the logical volume;
create a mount point for the file system; and
mount the filesystem.

5. The system as recited in claim 1, wherein the target volume is an internet small computer systems interface (ISCSI) target volume.

6. The system as recited in claim 5, the operations further comprising executing, by the virtual machine, the executable instructions to map the iSCSI target volume to a logical unit number.

7. The system as recited in claim 1, wherein establishing the first connection between the virtual machine and the second network storage to receive first quorum information comprises establishing, by the virtual machine, an internet small computer systems interface (iSCSI) path between the virtual machine and the second network storage.

8. The system as recited in claim 7, the operations further comprising executing, by the virtual machine, the executable instructions to:
determine an iSCSI qualified name (IQN) associated with the second network storage; and
establish the iSCSI path based at least on the IQN associated with the second network storage.

9. The system as recited in claim 1 the operations further comprising:

sending, by the virtual machine, to a user computing device, information to cause the user computing device to present a user interface;

receiving, by the virtual machine, via the user interface, an indication of an instruction to add a quorum volume;

based on the indication of the instruction to add the quorum volume:

determining free storage space for a new volume; and associating the new volume and a logical unit number with the free storage space.

10. The system as recited in claim 1, the operations further comprising:

sending, by the virtual machine, to a user computing device, information to cause the user computing device to present a user interface;

receiving, by the virtual machine, via the user interface, an indication of an instruction to delete a quorum volume;

sending a request, to the user computing device, for an identifier of the quorum volume; and based on a volume identifier received in a reply from the user computing device, deleting a volume corresponding to the volume identifier.

11. The system as recited in claim 1, wherein a site of the first network storage at which the quorum component is created is geographically remote from a site of the second network storage and a site of the third network storage.

12. The system as recited in claim 1, wherein the executable instructions executed by the virtual machine for creating the quorum component include an executable script for automating setup of the quorum component.

13. A method comprising:

receiving, by a computing device of a first network storage, a virtual machine image, the virtual machine image including an operating system, preset processor specification, and preset memory specification for creating a virtual machine on the computing device, and executable instructions to be executed by the virtual machine for creating a quorum component for a second network storage and a third network storage, wherein data is replicated between the second network storage and the third network storage, wherein the quorum component is configured to store replication status information of the second network storage and the third network storage related to replication of the data between the second network storage and the third network storage, the quorum component enabling both the second network storage and the third network storage to access the quorum component for checking a status of other of the second network storage and the third network storage;

implementing, by the computing device, the virtual machine on the computing device based on receiving the virtual machine image;

based at least on the computing device implementing the virtual machine, executing, by the virtual machine, the executable instructions for creating the quorum component including:

creating a logical volume on a storage device associated with the computing device;

creating, in the logical volume, a target volume for receiving and storing the replication status information from the second network storage and the third network storage, wherein the replication status information indicates a status of the replication of the data between the second network storage and the third network storage;

establishing a first connection between the virtual machine and the second network storage to receive first replication status information from the second network storage, and establishing a second connection between the virtual machine and the third network storage to receive second replication status information from the third network storage; and storing, by the virtual machine, the first replication status information and the second replication status information in the target volume for enabling the second network storage and the third network storage to check the replication status of the other of the second network storage and the third network storage.

14. The method as recited in claim 13, further comprising:

receiving the virtual machine image and executable instructions for creating the quorum component from a repository associated with a service provider associated with the first network storage.

15. The method as recited in claim 13, wherein the executable instructions executed by the virtual machine for creating the quorum component include an executable script for automating setup of the quorum component.

16. The method as recited in claim 13, wherein establishing the first connection between the virtual machine and the second network storage to receive first quorum information comprises establishing, by the virtual machine, an internet small computer systems interface (iSCSI) path between the virtual machine and the second network storage.

17. One or more non-transitory computer-readable media storing one or more programs executable by a computing device of a first network storage to configure the computing device to perform operations comprising:

receiving, by the computing device, a virtual machine image, the virtual machine image including an operating system, preset processor specification, and preset memory specification for creating a virtual machine on the computing device, and executable instructions to be executed by the virtual machine for creating a quorum component for a second network storage and a third network storage, wherein data is replicated between the second network storage and the third network storage, wherein the quorum component is configured to store replication status information of the second network storage and the third network storage related to replication of the data between the second network storage and the third network storage, the quorum component enabling both the second network storage and the third network storage to access the quorum component for checking a status of other of the second network storage and the third network storage;

implementing, by the computing device, the virtual machine on the computing device based on receiving the virtual machine image;

based at least on the computing device implementing the virtual machine, executing, by the virtual machine, the executable instructions for creating the quorum component including:

creating a logical volume on a storage device associated with the computing device;

creating, in the logical volume, a target volume for receiving and storing the replication status information from the second network storage and the third network storage, wherein the replication status information indicates a status of the replication of the data between the second network storage and the third network storage;

establishing a first connection between the virtual machine and the second network storage to receive first replication status information from the second network storage, and establishing a second connection between the virtual machine and the third network storage to receive second replication status information from the third network storage; and storing, by the virtual machine, the first replication status information and the second replication status information in the target volume for enabling the second network storage and the third network storage to check the replication status of the other of the second network storage and the third network storage.

18. The one or more non-transitory computer-readable media as recited in claim 17, the operations further comprising:

receiving the virtual machine image and executable instructions for creating the quorum component from a repository associated with a service provider associated with the first network storage.

19. The one or more non-transitory computer-readable media as recited in claim 14, wherein the executable instructions executed by the virtual machine for creating the quorum component include an executable script for automating setup of the quorum component.

20. The one or more non-transitory computer-readable media as recited in claim 17, wherein establishing the first connection between the virtual machine and the second network storage to receive first quorum information comprises establishing, by the virtual machine, an internet small computer systems interface (iSCSI) path between the virtual machine and the second network storage.

* * * * *